(12) United States Patent
Yang

(10) Patent No.: US 9,022,433 B2
(45) Date of Patent: *May 5, 2015

(54) QUICK CONNECTOR ADAPTED FOR A MALE ADAPTER TO CONNECT THERETO

(76) Inventor: Tsai-Chen Yang, Taichung (TW)

( * ) Notice: Subject to any disclaimer, the term of this patent is extended or adjusted under 35 U.S.C. 154(b) by 502 days.

This patent is subject to a terminal disclaimer.

(21) Appl. No.: 13/426,319

(22) Filed: Mar. 21, 2012

(65) Prior Publication Data

US 2013/0249211 A1 Sep. 26, 2013

(51) Int. Cl.
*F16L 37/127* (2006.01)
*E03C 1/04* (2006.01)

(52) U.S. Cl.
CPC ............. *F16L 37/127* (2013.01); *E03C 1/0403* (2013.01)

(58) Field of Classification Search
CPC ................................ F16L 37/14; F16L 37/127
USPC ............. 285/305, 320, 319; 16/267, 254, 260
See application file for complete search history.

(56) References Cited

U.S. PATENT DOCUMENTS

| 4,919,462 A * | 4/1990 | Matsui et al. ............... 285/149.1 |
| 5,401,063 A * | 3/1995 | Plosz ............................... 285/81 |
| 5,951,063 A | 9/1999 | Szabo |
| 6,254,145 B1 * | 7/2001 | Schwarz et al. ............... 285/319 |
| 8,371,620 B1 * | 2/2013 | Yang ............................ 285/320 |
| 2002/0079696 A1 * | 6/2002 | Szabo .............................. 285/39 |
| 2005/0258644 A1 * | 11/2005 | Yoshino ......................... 285/305 |
| 2007/0132235 A1 * | 6/2007 | Catlow .......................... 285/305 |

FOREIGN PATENT DOCUMENTS

TW 268559 1/1996

* cited by examiner

*Primary Examiner* — Daniel P Stodola
*Assistant Examiner* — James Linford
(74) *Attorney, Agent, or Firm* — Muncy, Geissler, Olds & Lowe, P.C.

(57) ABSTRACT

A quick connector includes a female adapter and two retainers. The female adapter has a joint portion and an axial hole being adapted for a male adapter inserting therein. The joint portion has two openings and two pairs of engaging portions. Each retainer includes a pair of pivot members positioned in one of two pairs of engaging portions, so that the retainers can pivot between a clamping position and a spreading position. The retainers are positioned in the engaging portions.

8 Claims, 8 Drawing Sheets

QUICK CONNECTOR ADAPTED FOR A MALE ADAPTER TO CONNECT THERETO

BACKGROUND OF THE INVENTION

1. Field of the Invention

The present invention relates to a connecting device, and more particularly to a quick connector which is adapted for a male adapter of an apparatus inserting and positioning therein.

2. Description of the Prior Art

A typical quick connector is disposed at one end of a pipe and adapted for a male adapter of an apparatus to be connected with the pipe quickly. A conventional quick connector, such as disclosed in TW Pat. No. 268559, comprises a retainer which is detachably received in a recess of the joint portion. A clamping end of the retainer engages in an embedded groove of the male adapter. Whereby the male adapter is able to be smoothly connected to the pipe firmly so that the male adapter does not loosen and separate from the pipe to fall down to the ground.

However, after said retainer engages the male adapter, the retainer hardly detaches from the male adapter. Users have to take great pains to remove the C-shaped retainer from the embedded groove of the male adapter. Moreover, in the removing process, the retainer could be deformed seriously, even broken. Furthermore, the C-shaped retainer is quite lighter, thinner, and smaller. When users take it out, it would separate from the recess of the joint portion completely. The users must put it away carefully, otherwise it would be lost easily.

There is a conventional quick connector, such as disclosed in U.S. Pat. No. 5,951,063, can resolve said disadvantages of the quick connector disclosed in TW Pat. No. 268559. Its retainer has some advantages. For example, the retainer engages and disengages from the male adapter quickly. Besides, the retainer could not separate from the joint portion. However, when users would like to the retainer disengage from the male adapter, the male adapter has to rotate to some particular angle so as to be removed from the quick connector. Said detaching means is so inefficient and very difficult to operate, therefore, users would waste much time and energy.

The present invention is, therefore, arisen to obviate or at least mitigate the above mentioned disadvantages.

SUMMARY OF THE INVENTION

The main object of the present invention is to provide a quick connector which comprises two retainers. The retainers can quickly engage and disengage from the male adapter by pivoting means. The retainers can pivot smoothly and would not be obstructed by a wall.

Another object of the present invention is to provide a quick connector which comprises two retainers. The retainers are selectively positioned in a predetermined position of the joint portion so as to be installed and dismantled easily.

To achieve the above and other objects, a quick connector of the present invention is adapted for a male adapter to connect thereto. The quick connector comprises a female adapter and two retainers.

The female adapter has a joint portion at one end thereof. The female adapter is formed with an axial hole. The axial hole is adapted for the male adapter inserting therein. The joint portion has an outer contour and an inner contour. The joint portion is formed with two openings extending radially and penetrating through the outer contour and the inner contour, so that the openings are in communication with the axial hole.

Wherein the inner contour of the joint portion has two limiting grooves.

The retainers are pivotally disposed on the joint portion. Each of the retainers comprises an inner arm and an outer arm. Each of the outer arms comprises a hook portion.

Wherein the retainers are able to pivot about an axis with respect to the joint portion and pivot between a clamping position and a spreading position. One of the retainers pivots in a clockwise direction, the other one of the retainers pivots in a counterclockwise direction.

When the retainers are in the clamping position, the retainers are located in the openings of the joint portion respectively. The inner arms engage the male adapter. The hook portions hook in the limiting grooves respectively.

When the hook portions are away from the limiting grooves, the retainers are able to pivot to the spreading position, so that the inner arms disengage from the male adapter.

Wherein the outer contour of the joint portion comprises a first side and a second side. The first side has two pairs of engaging portions in communication with the openings respectively. Each of the retainers comprises a pair of pivot members. Each pair of pivot members is positioned in a predetermined position of one of two pairs of engaging portions. Wherein each pair of engaging portions has two engaging portions, one is a penetrating hole, and the other is a recess having a narrow section and a broad section. The narrow section communicates between the broad section and the outer contour of the joint portion. An outer diameter of each pivot member equals to an inner diameter of each broad section. The pivot members respectively penetrate through the narrow sections and are respectively positioned in the broad sections.

As such, the present invention can engage and disengage from the male adapter quickly with the retainers by pivoting means. The retainers are selectively positioned in the predetermined position of the engaging portions so as to be installed and dismantled easily. Furthermore, the retainers would not be lost easily. Note that one of the retainers pivots in a clockwise direction, the other one of the retainers pivots in a counterclockwise direction, so that users can easily operate the retainers to pivot between the clamping position and spreading position. The retainers can pivot smoothly and would not be obstructed by the wall.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
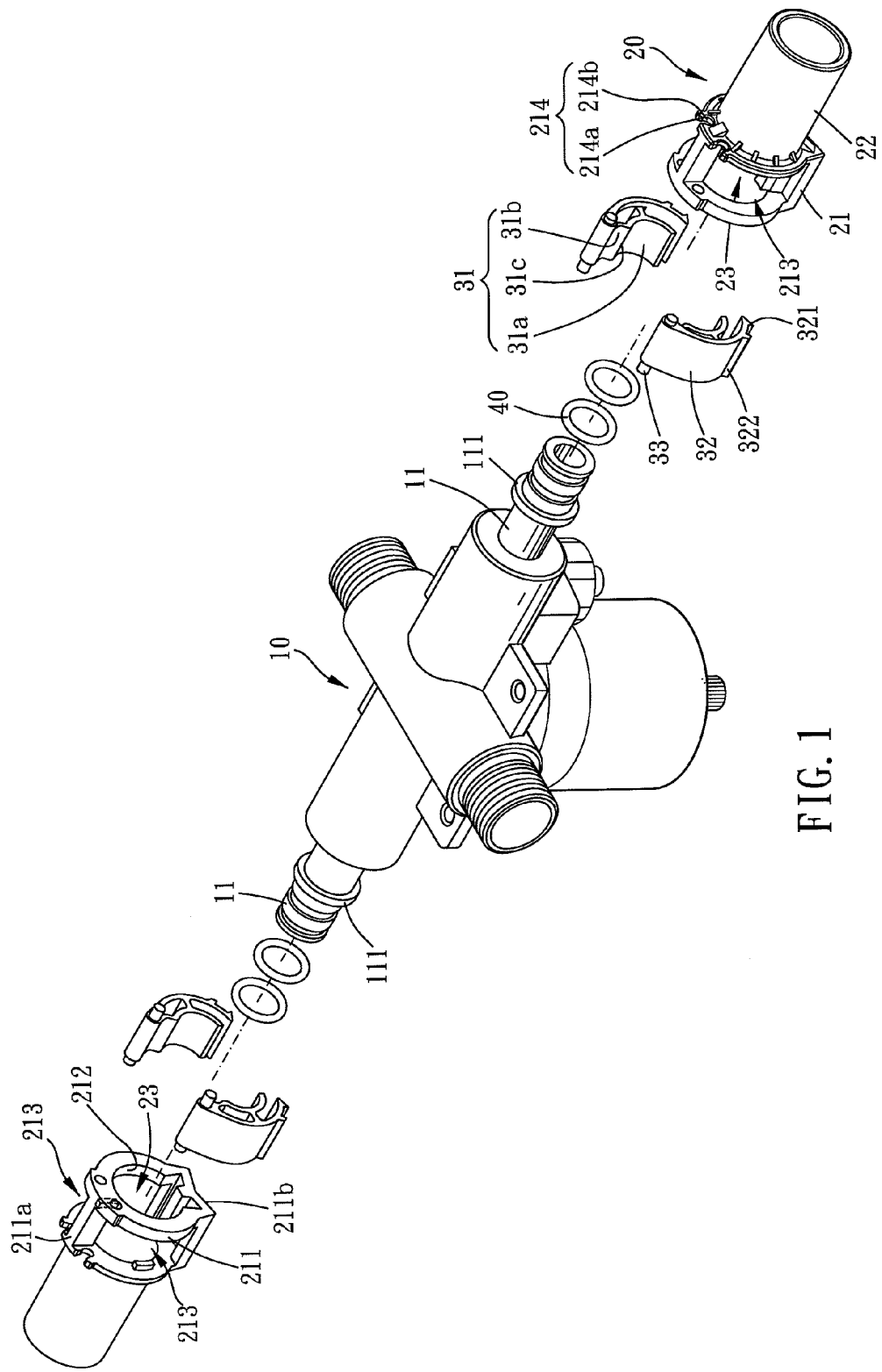
FIG. 1 is a breakdown drawing of a first embodiment of the present invention.

Please refer to FIG. 1 to FIG. 6 for a first embodiment of the present invention. A quick connector of the present invention is disposed on an additional pipe (not shown). The quick connector is adapted for a male adapter 11 to connect thereto. More specifically, the male adapter 11 is disposed on an apparatus 10. The male adapter 11 is connected to the additional pipe so that the apparatus 10 may communicate with another apparatus (not shown). Whereby gas or liquid in one of the apparatus can flow into another one. In the first embodiment of the present invention, the apparatus 10 is a faucet control valve. The male adapter 11 is formed on the control valve integrally. The male adapter 11 comprises a blocking rim 111. The quick connector comprises a female adapter 20 and two retainers 30.

Figure 2:
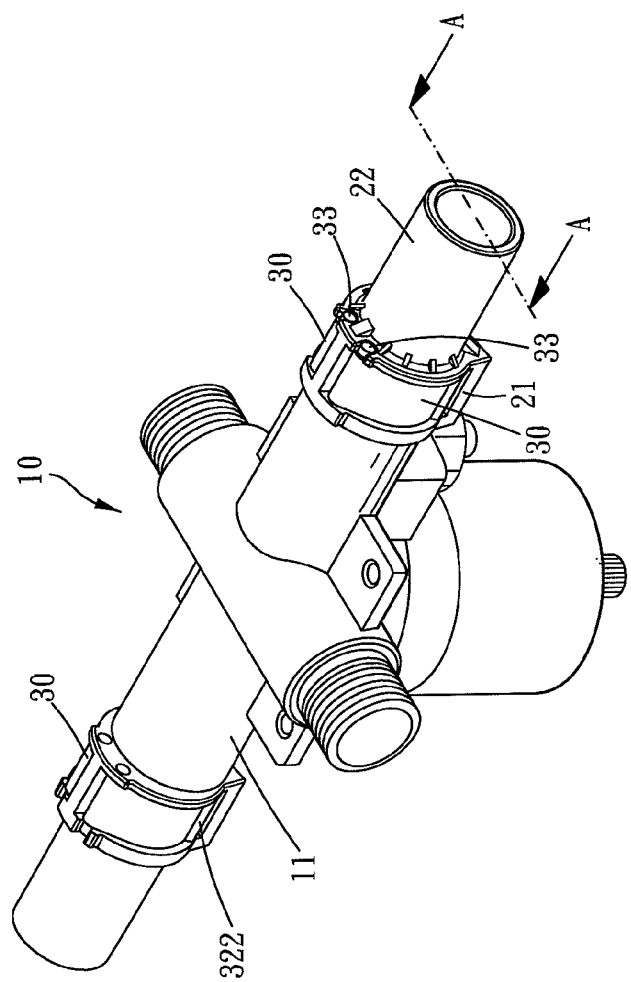
FIG. 2 is a stereogram of a first embodiment of the present invention.
Figure 4:
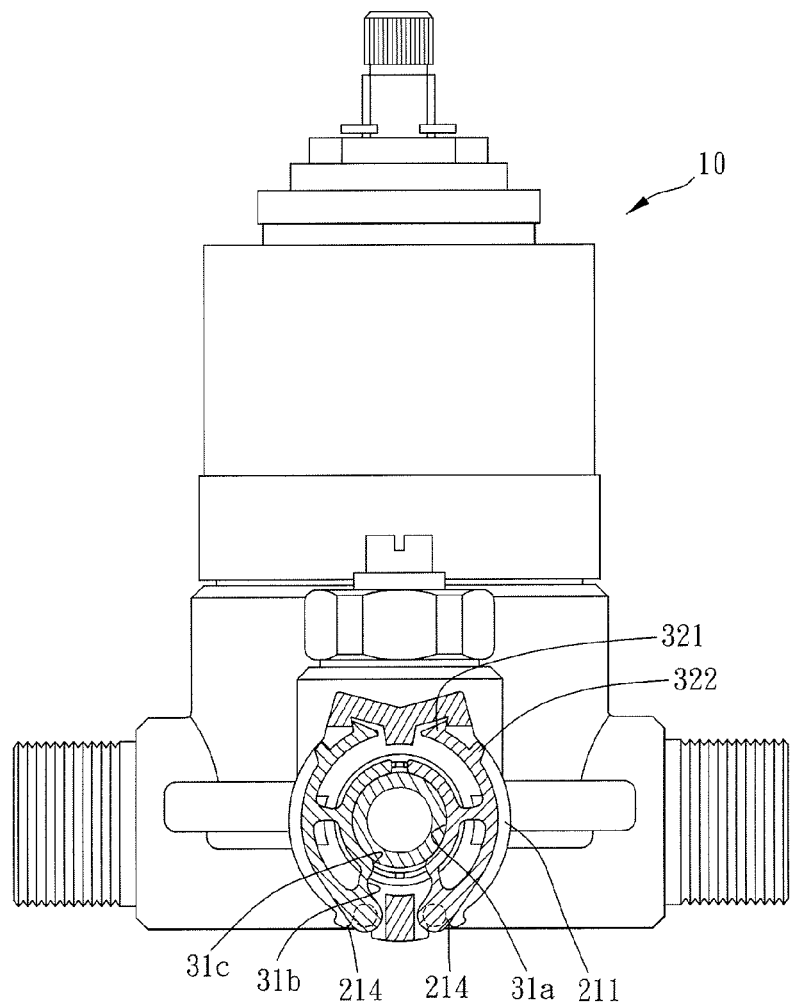
FIG. 4 is a partial front cross-sectional view of FIG. 2.

The female adapter 20 has a joint portion 21 at one end thereof and a connecting tube 22 at the end thereof. An outer periphery of a joint section between the joint portion 21 and the connecting tube 22 is disposed plural reinforcing ribs, as shown in FIG. 1 and FIG. 2. The reinforcing ribs can reinforce the whole structure of the female adapter 20. The connecting tube 22 can insert into the additional pipe direct. Also, the connecting tube 22 is the additional pipe and connects to another apparatus direct. Wherein the female adapter 20 is formed with an axial hole 23 which is adapted for the male adapter 11 inserting therein. The blocking rim 111 leans against one end of the connecting tube 22. The joint portion 21 has an outer contour 211 and an inner contour 212. The joint portion 21 is formed with two openings 213 extending radially and penetrating through the outer contour 211 and the inner contour 212, so that the openings 213 are in communication with the axial hole 23. Additionally, the outer contour 211 of the joint portion comprises a first side 211a and a second side 212b. The first side 211a has two pairs of engaging portions 214 in communication with the openings 213 respectively. Preferably, extending directions of two pairs of engaging portions 214 are non-parallel to each other. Each pair of engaging portions 214 has two engaging portions, one is a penetrating hole, and the other is a recess having a narrow section 214a and a broad section 214b. The narrow section 214a communicates between the broad section 214b and the outer contour 211 of the joint portion. Moreover, the inner contour 212 of the joint portion has two limiting grooves 212a at a side of the inner contour 212 in which is adjacent to the second side 211b of the outer contour. Positions of two limiting grooves 212a correspond to positions of two pairs of engaging portions 214 respectively.

The retainers 30 are pivotally disposed on the joint portion 21. Each of the retainers 30 comprises an inner arm 31, an outer arm 32, a pair of pivot members, and a plurality of connecting portions 34. The inner arm 31 is arc shaped, and so is the outer arm 32. Also, the outer arm is L shaped or other shapes. Wherein each of the outer arms 32 comprises a hook portion 321 and a bump 322 protruding from a side of the outer arm 32 which is away from the inner arm 31. Each of the inner arms 31 is formed with a first arc section and a second arc section. The first arc section has a first concave surface 31a at a side of the first arc section where is away from the outer arm 32. The second arc section has a second concave surface 31b at a side of the second arc section where is away from the outer arm 32. The first and the second concave surfaces 31a, 31b are eccentric so that a protruding portion 31c is formed between the first and the second arc sections. The protruding portion 31c extends away from the outer arm 32. Each pair of pivot members 33 is located between a fixed end of the outer arm 32 and a fixed end of the inner arm 31. More specifically, each pair of pivot members 33 is located between the fixed end of the outer arm 32 and one end of the second arc section. The other end of the second arc section connects to one end of the first arc section. Wherein each pair of pivot members 33 is positioned in a predetermined position of one pair of engaging portions 214. The connecting portions 34 connect between the inner arm 31 and the outer arm 32. Whereby the connecting portions 34 make the structure intensity of the retainers stronger so that the inner arm 31 and the outer arm 32 can recover to original shape at any time. Preferably, a recessed space 341 is defined between any two of connecting portions 34 which are adjacent to each other. In this embodiment, two recessed spaces 341 are formed between any two of connecting portions 34 which are adjacent to each other. The recessed spaces 341 are not communicating with each other. In other embodiments, the recessed spaces 341 can also pass through both sides of the retainers 30 so that the recessed spaces 341 are hollow. Because the connecting portions maintain the structure intensity of the retainer up stronger, manufacturers can design said recessed spaces 341 in the retainers 30 to achieve the purpose of reducing production costs.

Figure 3:
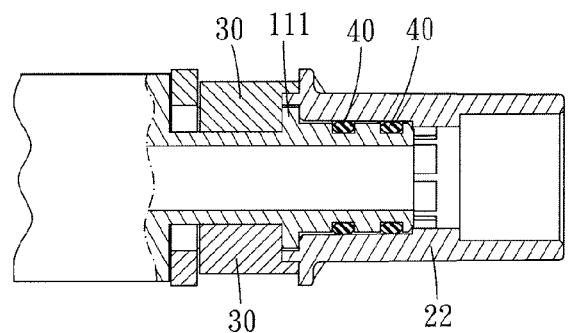
FIG. 3 is an AA cross-sectional view of FIG. 2.

When users would like to connect the present invention to the male adapter 11, first of all, the male adapter 11 inserts to the axial hole of the female adapter. Preferably, one end of the male adapter inserts into the connecting tube 22 till the blocking rim 111 abuts one end of the connecting tube 22, as shown in FIG. 3. Furthermore, the pivot members 33 of the retainers 30 are positioned in the predetermined position of one of two pairs of engaging portions 214. The retainers 30 are able to pivot about an axis with respect to the joint portion 21 and pivot between a clamping position and a spreading position. When the retainers 30 are in the clamping position, the retainers 30 are located in the openings 213 of the joint portion respectively. The inner arms 31 engage the male adapter 11 together. At the same time, the first concave surfaces 31a of the inner arms abut against an outer surface of the male adapter 11 tightly when the inner arms 31 engage the male adapter 11. The hook portions 321 hook in the limiting grooves 212a respectively.

Figure 5:
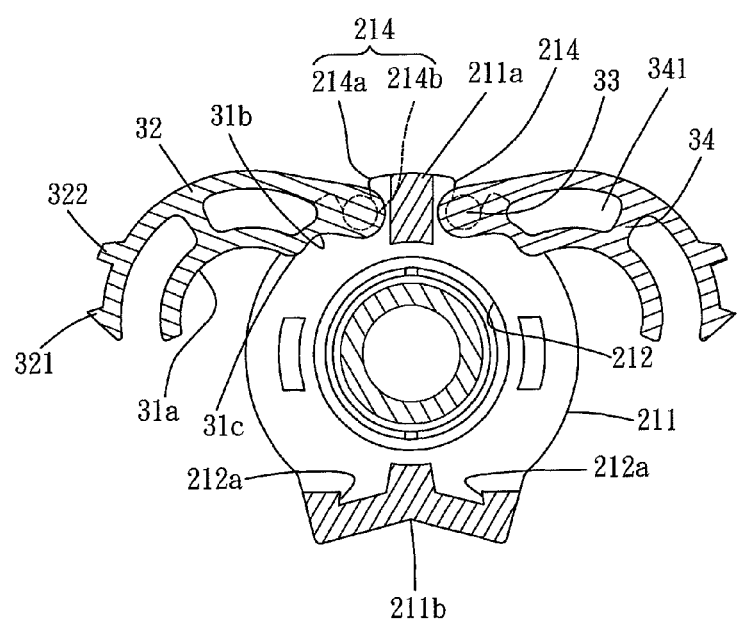
FIG. 5 is a partially enlarged drawing of a first embodiment of the present invention.
Figure 6:
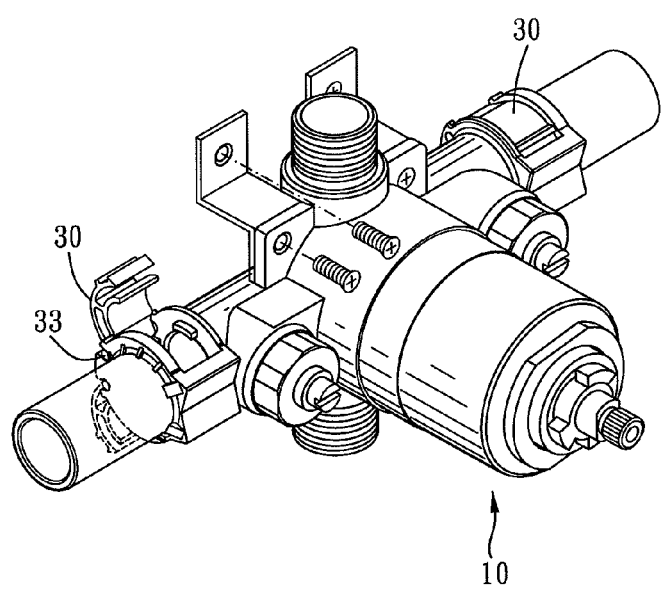
FIG. 6 is a schematic drawing showing a first embodiment of the present invention mounting on a wall.

When users would like to detach the male adapter 11 from the present invention, press the retainers 30 so that the hook portions 321 are away from the limiting grooves 212a respectively. Thereafter, users can move the retainers 30 upward with the bump 322 and pivot to the spreading position, as shown in FIG. 5, so that the inner arms 31 disengage from the male adapter 11. At the same time, the male adapter 11 can be taken out.

It is noted that due to the first and the second arc sections of the inner arm 31 have the same curve direction, but eccentric, especially the second concave surface 31a of the second arc section is located at the side of the second arc section which is away from the outer arm 32. When the retainers 30 pivot toward the spreading position, the inner arms can pass through the male adapter 11 because of the second arc sections. Whereby the inner arms may not be obstructed by the male adapter 11 or rub with the male adapter 11 so that the inner arms 31 pivot to the spreading position smoothly.

Figure 7:
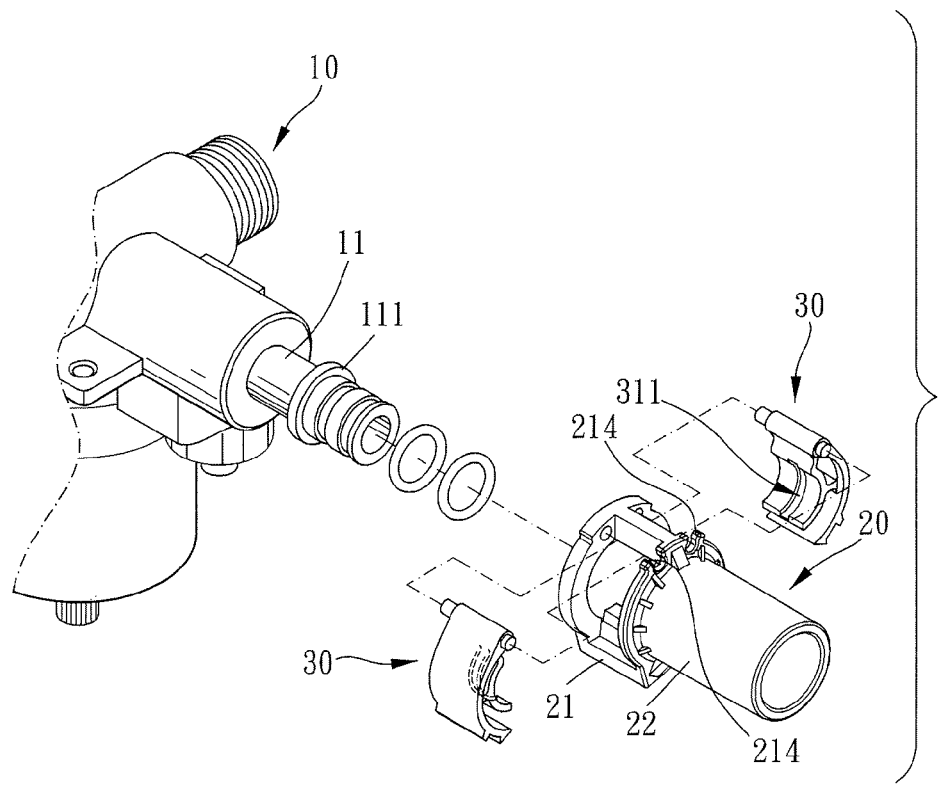
FIG. 7 is a breakdown drawing of a second embodiment of the present invention.
Figure 8:
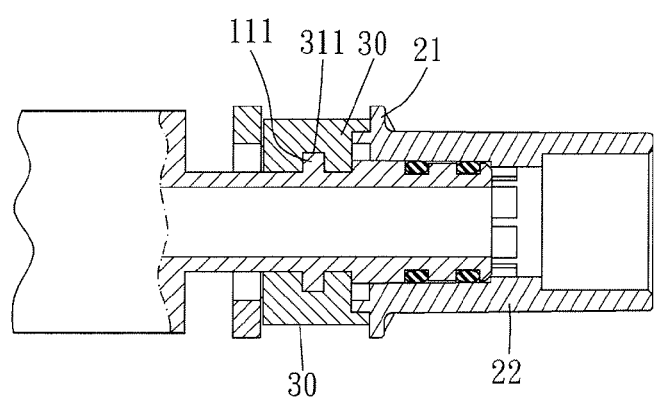
FIG. 8 is a partial side cross-sectional view of a second embodiment of the present invention.

Please refer to FIG. 7 and FIG. 8, in a second embodiment, each of inner arms 31 is formed with a positioning groove 311 extending from a fixed end thereof to a free end thereof. When the retainers 30 are in the clamping position, the blocking rim 111 is positioned in predetermined positions of the positioning grooves 311 of the inner arms, so that the retainers 30 not only clamp the male adapter 11, but fix the male adapter 11 in the axial hole firmly, and the male adapter 11 cannot slide from back and forth because of the positioning grooves 311. When the retainers 30 pivot to the spreading position, the male adapter 11 can be removed easily so as to further improve the prior art's problem that the male adapter has got to rotate to some particular angle in other to be removed from the conventional quick connector.

Figure 9:
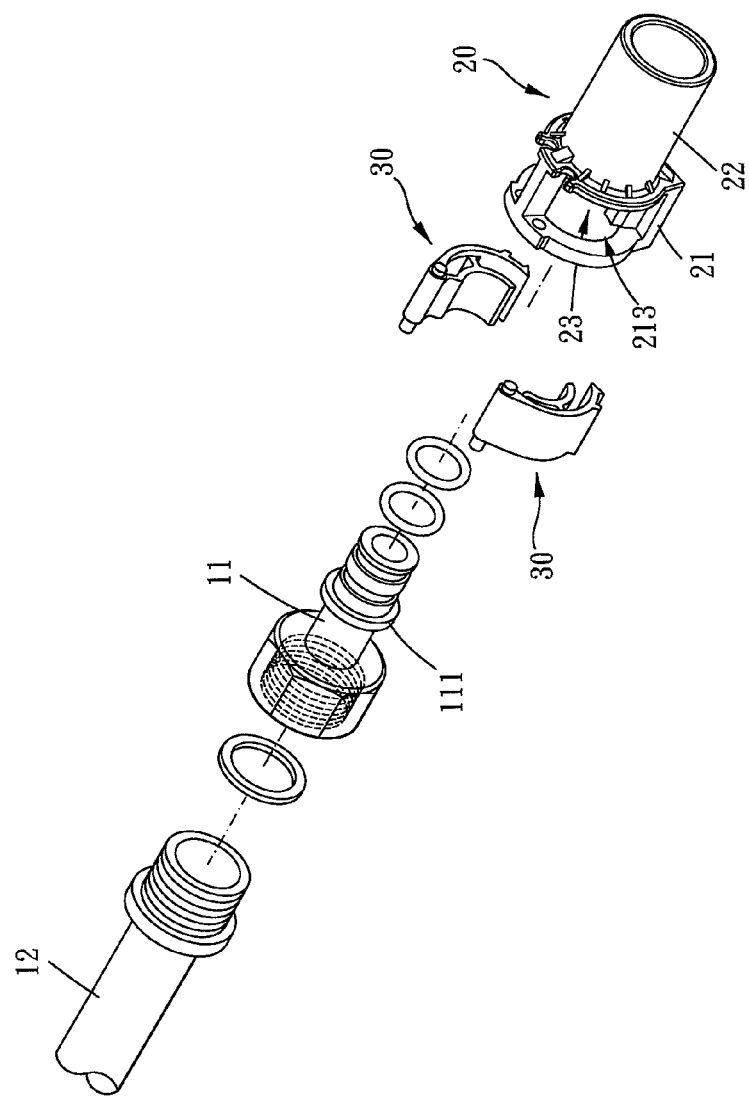
FIG. 9 is a breakdown drawing of a third embodiment of the present invention.

Please refer to FIG. 9, in a third embodiment of the present invention, the male adapter 11 is not formed on the apparatus 10 integrally. The apparatus 10 has a tube 12 additionally. The tube 12 has a threaded section. One end of the male adapter 11 inserts into the axial hole of the female adapter 20, the other end of the male adapter 11 engages on the threaded section of the tube 12.

Figure 10:
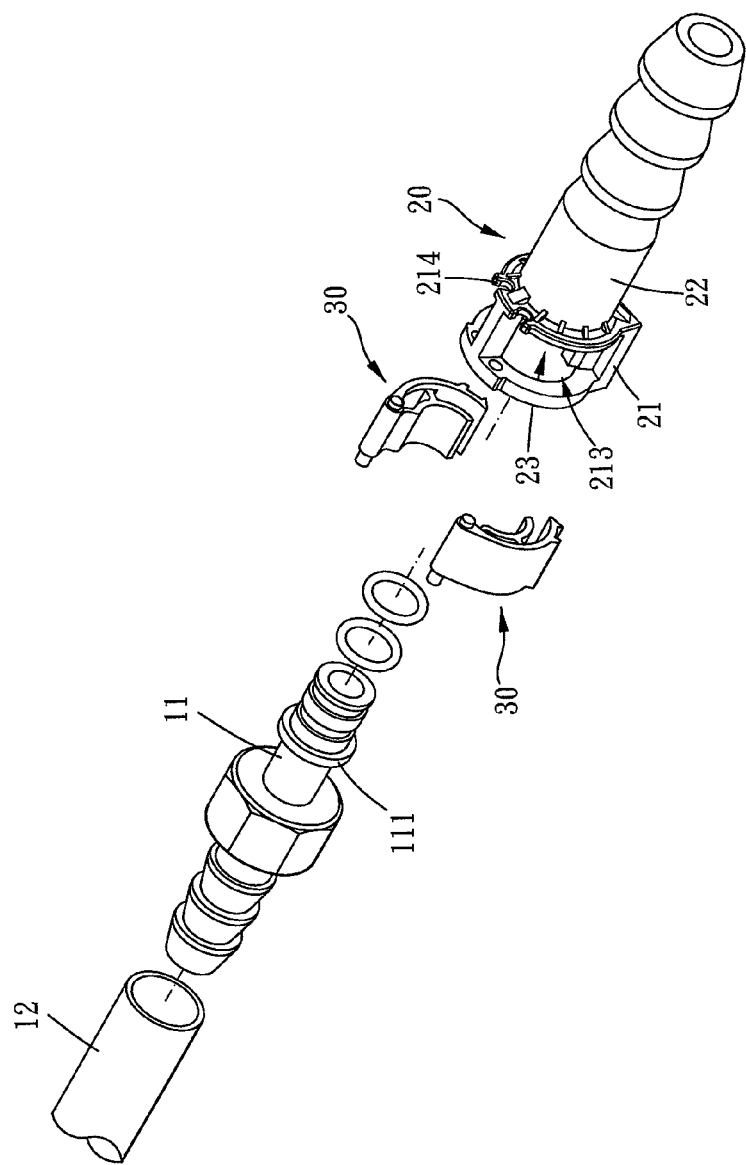
FIG. 10 is a breakdown drawing of a fourth embodiment of the present invention.

Please refer to FIG. 10, in a fourth embodiment of the present invention, the tube 12 is elastic, such as a rubber hose or a plastic hose. The outer surface of one end of the male adapter 11 is formed with plural first pyramidal structures narrowing down toward the same direction and being in a line. The tube 12 can cover the other end of the male adapter 11 direct. Whereby the first pyramidal structures prevent the tube 12 from slipping out of the male adapter 11. The outer surface of the connecting tube 22 of the female adapter is formed with plural second pyramidal structures narrowing down toward the same direction and being in a line. The additional pipe is elastic so that it may cover the connecting tube 22 direct. Whereby the second pyramid structures prevent the additional pipe from slipping out of the connecting tube 22.

To sum up, the present invention can accomplish the purpose of connecting the male adapter 11 to the present invention fast and tightly with the pivotable retainers 30. Besides, the male adapter 11 has two seals 40 preventing gas or liquid from leaking. Moreover, the outer arms have the bump 322 so that the retainers 30 are able to disengage from the limiting grooves 212a easily and fast, and the retainers 30 can pivot to the spreading position.

It is important that the engaging portions 214 are located at the same side of the outer contour 211 of the joint portion, and the positions of two limiting grooves 212a correspond to the positions of two pairs of engaging portions 214 respectively. That is to say, the pivot members of the retainers are located at the same side of the outer contour 211 of the joint portion when each pair of pivot members 33 is positioned in the predetermined position of one pair of engaging portions 214. As a result, one of the retainers 30 pivots in a clockwise direction, the other retainer 30 pivots in a counterclockwise direction, as shown in FIG. 5. Please refer to FIG. 6, when the faucet control valve mounts on a wall, the first side 211a of the outer contour of the joint portion closes to the wall, the second side 211b of the outer contour of the joint portion is away from the wall. While users pivot the retainers 30 to engage the male adapter 11, they can use their thumps and forefingers to press the retainers 30 slightly and simultaneously, so that the retainers 30 would pivot to the clamping position and engage the male adapter 11. While users detach the male adapter 11 from the present invention, they can easily accomplish the action of pressing the retainers 30 inwardly and moving the same outwardly by one hand or a tool. The retainers 30 can pivot smoothly and would not be obstructed by the wall.

It is noted that an outer diameter of each pivot member 33 equals to an inner diameter of each broad section 214b. Thus the pivot members 33 respectively penetrate through the narrow sections 214a and are respectively positioned in the broad sections 214b. That is to say, when the retainers 30 install on the female adapter 20, the retainers are secured in the engaging portions 214 respectively, so that the retainers do not get out from the engaging portions 214. When the present invention isn't used for the male adapter 11 to connect thereto yet, the retainers 30 can't separate from the engaging portions 214. As such, the retainers would not be lost easily.

What is claimed is:

1. A quick connector, being adapted for a male adapter to connect thereto, the quick connector comprising:
a female adapter, having a joint portion at one end thereof, the female adapter being formed with an axial hole, the axial hole being adapted for the male adapter inserting therein, the joint portion having an outer contour and an inner contour, the joint portion being formed with two openings extending radially and penetrating through the outer contour and the inner contour, so that the openings are in communication with the axial hole;
wherein the inner contour of the joint portion has two limiting grooves; and
two retainers, pivotally disposed on the joint portion, each of the retainers comprising an inner arm and an outer arm, each of the outer arms comprising a hook portion; wherein the retainers are able to pivot about an axis with respect to the joint portion and pivot between a clamping position and a spreading position;
when the retainers are in the clamping position, the retainers being located in the openings of the joint portion respectively, the inner arms engaging the male adapter, the hook portions hooking in the limiting grooves respectively;
when the hook portions are away from the limiting grooves, the retainers being able to pivot to the spreading position, so that the inner arms disengage from the male adapter;
wherein the outer contour of the joint portion comprises a first side and a second side opposite to the first side, a protrusion is formed on the first side, the two retainers are pivoted at two corresponding lateral sides of the protrusion;
wherein each of the inner arms is formed with a first arc section having a first concave surface and a second arc section having a second concave surface, the first and the second concave surfaces are eccentric so that a protruding portion is formed between the first and the second arc sections, the protruding portion extends away from the outer arm, the first concave surfaces of the inner arms abut against an outer surface of the male adapter tightly when the inner arms engage the male adapter.

2. The quick connector of claim 1, wherein the first side has two pairs of engaging portions in communication with the openings respectively, each of the retainers comprises a pair of pivot members, each pair of pivot members is positioned in a predetermined position of one of two pairs of engaging portions.

3. The quick connector of claim 2, wherein extending directions of two pairs of engaging portions are non-parallel to each other.

4. The quick connector of claim 2, wherein each pair of engaging portions has two engaging portions, one is a penetrating hole, and the other is a recess having a narrow section and a broad section, the narrow section communicates between the broad section and the outer contour of the joint portion, an outer diameter of each pivot member equals to an inner diameter of each broad section, the pivot members respectively penetrate through the narrow sections and are respectively positioned in the broad sections.

5. The quick connector of claim 2, wherein positions of two limiting grooves correspond to positions of two pairs of engaging portions respectively.

6. The quick connector of claim 2, wherein each pair of pivot members is located between a fixed end of the outer arm and a fixed end of the inner arm.

7. The quick connector of claim 1, wherein each of the outer arms comprises a bump protruding from a side of the outer arm which is away from the inner arm.

8. The quick connector of claim 1, wherein each of the retainers comprises a plurality of connecting portions connecting between the inner arm and the outer arm, a recessed space is defined between any two of connecting portions which are adjacent to each other.

* * * * *